(12) United States Patent
Okamoto

(10) Patent No.: US 10,764,459 B2
(45) Date of Patent: Sep. 1, 2020

(54) IMAGE READING APPARATUS CAPABLE OF SHIELDING ILLUMINATION LIGHT NOT TO LEAK OUTSIDE

(71) Applicant: KYOCERA Document Solutions Inc., Osaka-shi, Osaka (JP)

(72) Inventor: Kazuhiro Okamoto, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/422,656

(22) Filed: May 24, 2019

(65) Prior Publication Data

US 2019/0373131 A1 Dec. 5, 2019

(30) Foreign Application Priority Data

May 30, 2018 (JP) .................. 2018-102941

(51) Int. Cl.
*H04N 1/00* (2006.01)
*H04N 1/12* (2006.01)

(52) U.S. Cl.
CPC ....... *H04N 1/00997* (2013.01); *H04N 1/1235* (2013.01)

(58) Field of Classification Search
CPC .................................................. H04N 1/1235
USPC .......................................................... 358/475
See application file for complete search history.

(56) References Cited

U.S. PATENT DOCUMENTS

2008/0231919 A1* 9/2008 Sugahara ................. H04N 1/10
358/488
2018/0302530 A1* 10/2018 Inui ........................ G03G 15/60

FOREIGN PATENT DOCUMENTS

JP 05297665 A 11/1993

* cited by examiner

*Primary Examiner* — Saeid Ebrahimi Dehkordy
(74) *Attorney, Agent, or Firm* — Alleman Hall Creasman & Tuttle LLP

(57) ABSTRACT

An image reading apparatus includes a main body, a document pressing plate, and a light shielding portion. The main body has an image obtaining portion which irradiates illumination light on a document placed on a contact glass and captures an image formed on the document. The document pressing plate is attached to the main body in such a way as to pivot around a pivot shaft that is provided on a rear side above an upper surface of the main body. The pivot shaft moves in an up-down direction with respect to the main body. The light shielding portion, when the document pressing plate presses downward the document, extends downward from the document pressing plate with increase of an interval between the document pressing plate and the upper surface on the rear side in the up-down direction, so as to shield the illumination light not to leak outside.

6 Claims, 6 Drawing Sheets

IMAGE READING APPARATUS CAPABLE OF SHIELDING ILLUMINATION LIGHT NOT TO LEAK OUTSIDE

INCORPORATION BY REFERENCE

This application is based upon and claims the benefit of priority from the corresponding Japanese Patent Application No. 2018-102941 filed on May 30, 2018, the entire contents of which are incorporated herein by reference.

BACKGROUND

The present disclosure relates to an image reading apparatus for optically reading an image from a document.

In an image reading apparatus that obtains image data by optically reading an image from a document on which the image is formed, the document is placed on transparent contact glass that is provided on an upper surface of the apparatus, in such a manner that a surface of the document from which the image is read from downward. Illumination light is then irradiated from downward on the surface via the transparent contact glass, and the image is read from downward by an imaging element. For the image to be read appropriately, it is necessary to maintain a state where the document is in close contact with the contact glass. For this purpose, a document pressing plate is used to press, from upward, the document placed on the contact glass.

In some of such image reading apparatuses, a document feeding device may be provided to feed a plurality of document sheets one by one so that images can be read from the document sheets. In that case, since the document feeding device is located above the placed document sheet, the document feeding device is configured to serve as the document pressing plate. Here, since each of the plurality of document sheets is considerably thinner than 1 mm, an interval between the document feeding device (the document pressing plate) and the contact glass is narrow.

On the other hand, for example, when one page of a booklet literature is read, the document feeding device cannot be used. The user needs to place the booklet literature on the contact glass so that a reading-target page faces downward, and cause the reading operation to be performed in that state. In this case, since the booklet literature has a certain thickness, the interval between the document pressing plate and the contact glass is as wide as the thickness of the booklet literature, and the thickness may be equal to or larger than 1 cm.

Ordinarily, the document feeding device (the document pressing plate) is attached to the image reading apparatus such that it can pivot in the vertical direction with respect to the main body of the image reading apparatus that has the contact glass on its upper surface. For this case, there are known some structures that allow documents of various thicknesses to be in close contact with the contact glass. FIG. 5a, FIG. 5b, and FIG. 5c show examples of such structures in three typical states. In a conventional image reading apparatus 2, on an upper surface 90A of a main body 90 of the image reading apparatus 2, a contact glass 91 having a surface that is wide in a horizontal plane is provided, and a document pressing plate 92 is provided above the contact glass 91. The document pressing plate 92 is configured to pivot in the vertical direction around a pivot shaft 92A that is provided on the rear side (the right side in the drawing) thereof and elongates along a direction perpendicular to the paper surface. Since the pivot shaft 92A is located above the upper surface 90A, the pivot shaft 92A is provided in a support portion 93. The support portion 93 is attached to the main body 90 so as to protrude upward from the main body 90. The document pressing plate 92 is attached to the main body 90 via the support portion 93. The support portion 93 is configured to move in the up-down direction with respect to the main body 90 (the upper surface 90A).

FIG. 5a shows a state where the document pressing plate 92 has been pivoted upward (opened). In the state shown in FIG. 5a, the user, in front of the apparatus (on the left side in the drawing), can place a document on the exposed contact glass 91 and then close the document pressing plate 92 by pivoting the document pressing plate 92 counterclockwise in the drawing. FIG. 5b shows a state where a thin document P1 (for example, a sheet of paper) has been placed and the document pressing plate 92 has been closed. When the above-described document feeding device is used, this state is realized automatically. With this configuration, the document P1 is uniformly pressed downward by the document pressing plate 92. In this state, an image obtaining portion 95 provided inside the main body 90 irradiates illumination light L from downward on the document P1 via the contact glass 91, captures an image of the document P1 from downward, and obtains image data.

On the other hand, FIG. 5c shows a state where a thick document P2 (for example, a booklet literature) has been placed in a similar manner, and the document pressing plate 92 has been closed. In this case, the support portion 93 is positioned higher than in the case of FIG. 5b, allowing the pivot shaft 92A to be positioned higher than in the case of FIG. 5b. From the state shown in FIG. 5b, the document pressing plate 92 has moved upward in parallel. As a result, in the state shown in FIG. 5c, as in the case of FIG. 5b, the whole surface of the thick document P2 is uniformly pressed downward by the document pressing plate 92. With this configuration, as in the case shown in FIG. 5b, the image obtaining portion 95 can read the image of the document P2 by irradiating the illumination light L on the document P2 from downward. In this case, different from the case where the document feeding device is used, the user, in front of the apparatus, can place the document P2 on the contact glass 91 and cause the apparatus to perform the reading while pressing the document pressing plate 92 from upward. That is, with this configuration, it is possible to make the document pressing plate 92 press the document so that the whole surface of the document is uniformly in contact with the contact glass 91, and the image obtaining portion 95 can read an image appropriately, regardless of the thickness of the document.

SUMMARY

An image reading apparatus according to an aspect of the present disclosure includes a main body, a document pressing plate, and a light shielding portion. On an upper surface of the main body, contact glass is provided. The main body has, inside thereof, an image obtaining portion which irradiates illumination light from downward, via the contact glass, on a document placed on the contact glass and captures, from downward, an image formed on the document. The document pressing plate is attached to the main body in such a way as to pivot in a vertical direction around a pivot shaft that is provided on a rear side above the upper surface. The document pressing plate presses downward the document placed on the contact glass. The pivot shaft moves in an up-down direction with respect to the main body. The light shielding portion, when the document pressing plate presses downward the document placed on the contact glass, extends downward from the document pressing plate with increase of an interval between the document pressing plate and the upper surface on the rear side in the up-down direction, so as to shield the illumination light not to leak outside in a horizontal direction.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
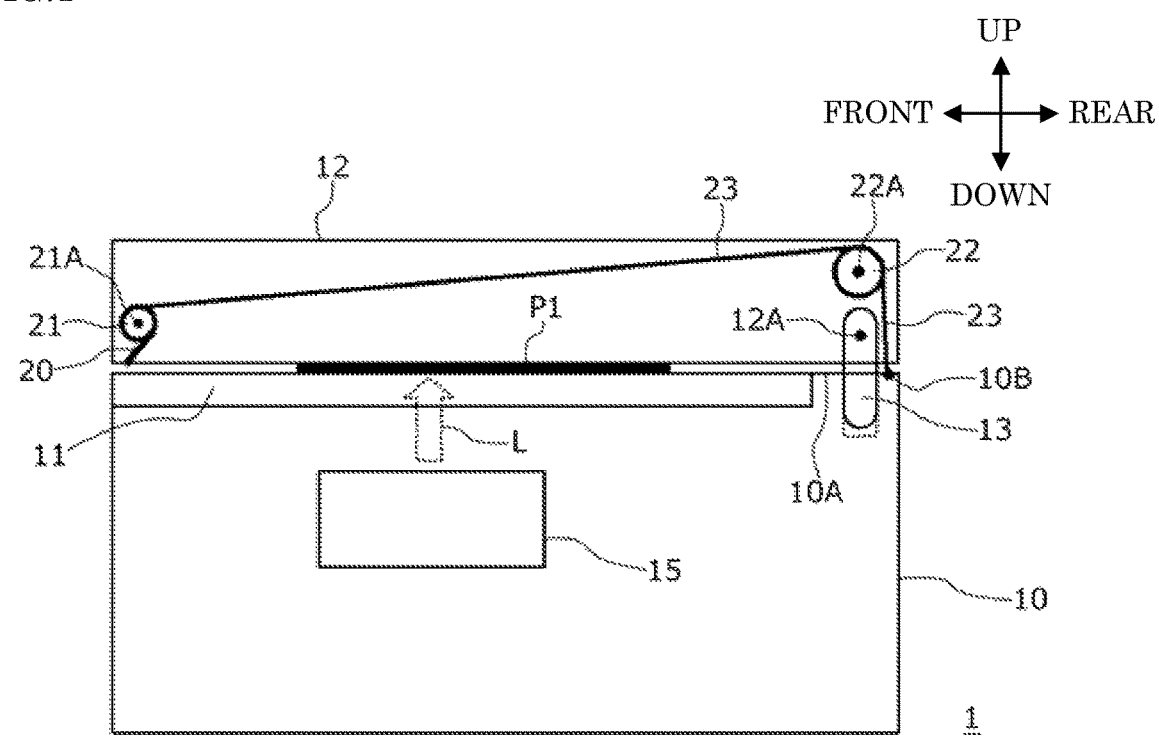
FIG. 1 is a diagram showing a configuration of an image reading apparatus according to an embodiment of the present disclosure in a first state.

The following describes an embodiment of the present disclosure with reference to the accompanying drawings. FIG. 1 is a diagram showing a schematic entire configuration of an image reading apparatus 1 according to the embodiment of the present disclosure in a state where a thin document P1 is read (a first state), in correspondence with FIG. 5b.

Figure 5A:
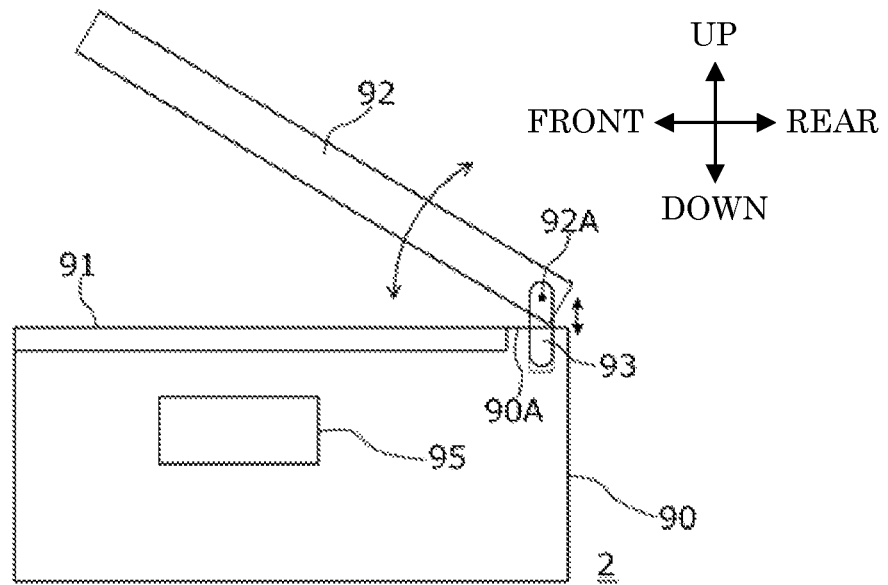
FIG. 5a is a diagram showing a configuration of a conventional image reading apparatus.
Figure 5B:
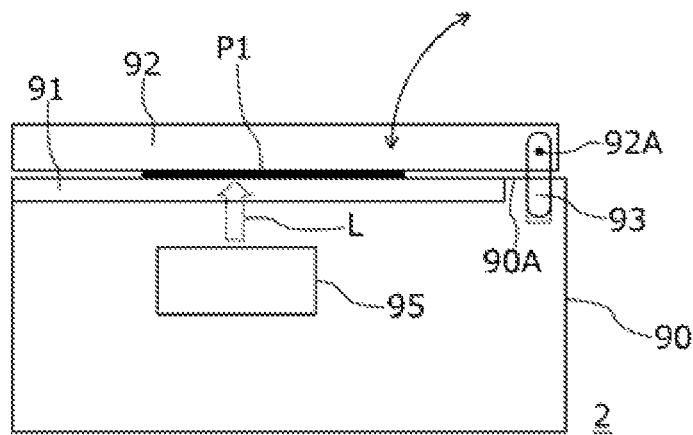
FIG. 5b is a diagram showing a configuration of the conventional image reading apparatus.

As is the case with the image reading apparatus 2 shown in FIG. 5b, the image reading apparatus 1 includes a main body 10, an upper surface 10A, a contact glass 11, a document pressing plate 12, a pivot shaft 12A, a support portion 13, and an image obtaining portion 15. These components have the same functions as those of the image reading apparatus 2, and in the image reading apparatus 1, too, the support portion 13 is configured to move in the up-down direction with respect to the main body 10. As a result, the positional relationship among the document pressing plate 12, the document P1, and the contact glass 11 (the upper surface 10A) is the same as that shown in FIG. 5b. In addition, in the image reading apparatus 1 too, a document feed device can be used as the document pressing plate 12. The support portion 13 is biased downward by a spring or the like (not shown) or the self-weight of the document pressing plate 12.

Figure 2:
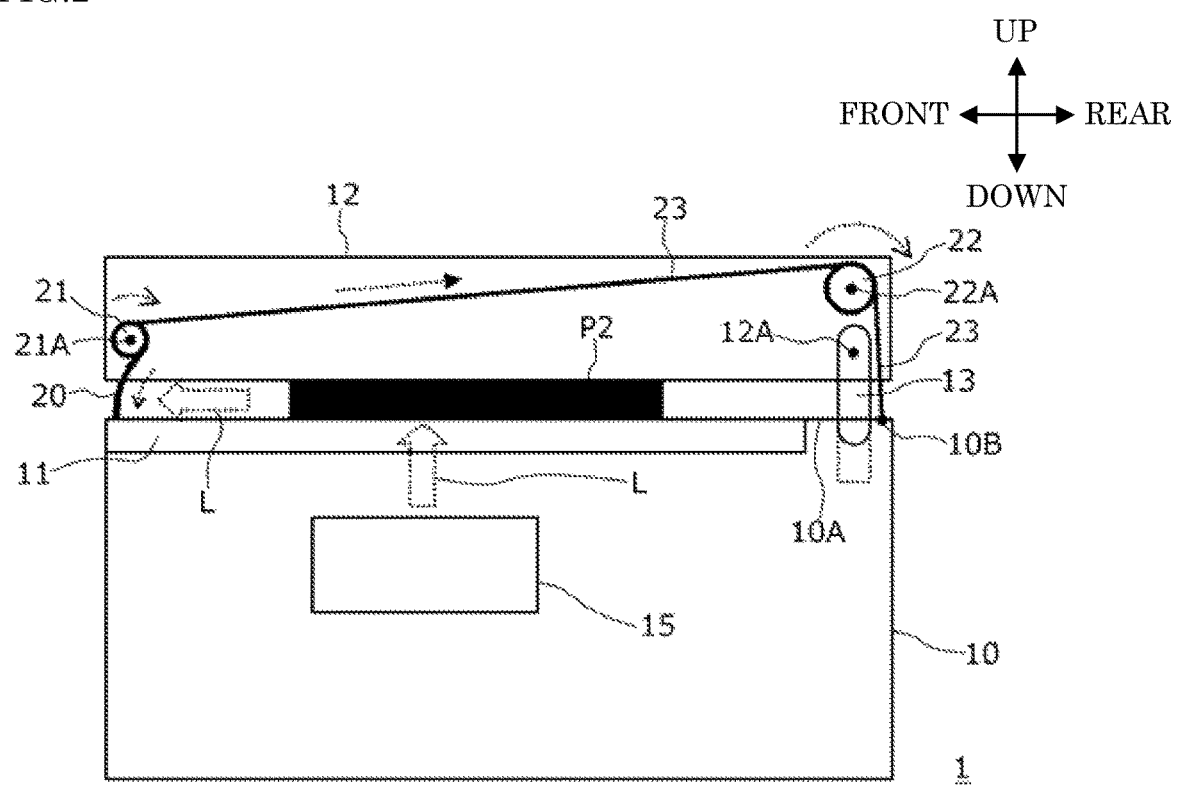
FIG. 2 is a diagram showing a configuration of the image reading apparatus according to the embodiment of the present disclosure in a second state.
Figure 5C:
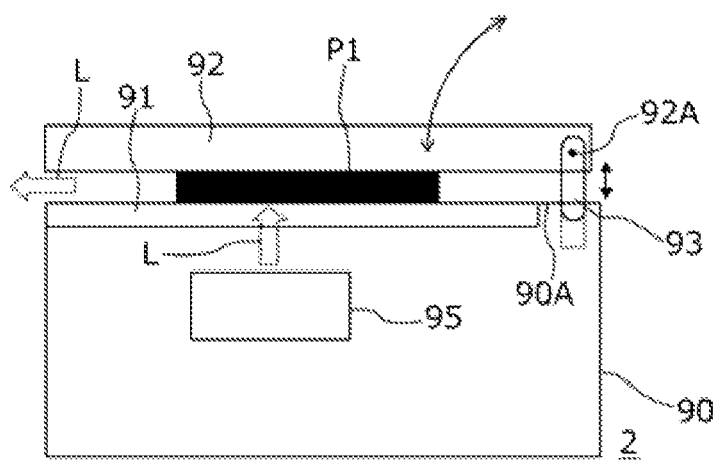
FIG. 5c is a diagram showing a configuration of the conventional image reading apparatus.

On the other hand, FIG. 2 shows a state (a second state) where a thick document P2 is read by the image reading apparatus 1, in correspondence with FIG. 5c. In this case, too, the positional relationship among the document pressing plate 12, the document P, and the contact glass 11 (the upper surface 10A) is the same as that shown in FIG. 5c. Accordingly, in the image reading apparatus 1, the document is pressed toward the contact glass 11 uniformly by the document pressing plate 12 regardless of the thickness of the document. This allows the image obtaining portion 15 to read an image from the document appropriately.

Meanwhile, in the state shown in FIG. 5c where the thick document P2 is placed, there may be a case where a wide interval of 1 cm or more is formed between the document pressing plate and the contact glass. In that case, illumination light L that comes from downward during reading of the document, may leak outside from a gap between the document pressing plate 92 and the contact glass 91. In this case, especially when the illumination light L illuminates the user who is in front of the apparatus (on the left side in the drawing), the user may become uncomfortable, or the operation of the user may be hindered by the glaring light. As a result, an image reading apparatus has been demanded that can prevent illumination light from leaking outside even when a thick document is read.

With regard to the above-described problem, the image reading apparatus 1 according to the embodiment of the present disclosure is configured to prevent illumination light from leaking outside even when reading a thick document, as described below.

Specifically, in the image reading apparatus 1, in the state shown in FIG. 2 where a wide interval is formed between the document pressing plate 12 and the contact glass 11, a light shielding portion 20 extends downward from the document pressing plate 12 in front of the document P2 (on the left side in the drawing). The light shielding portion 20 is formed from a thin sheet-like material (for example, resin material) that does not transmit light, and extends in the vertical direction in the drawing. In the state shown in FIG. 2, the light shielding portion 20 restricts the illumination light L from leaking frontward.

On the other hand, in the state shown in FIG. 1 where the interval between the document pressing plate 12 and the contact glass 11 is narrow, the light shielding portion 20 does not extend downward from the document pressing plate 12. This configuration prevents a state where the document P1 is not in close contact with the document pressing plate 12 due to the light shielding portion 20 sandwiched between the document pressing plate 12 and the contact glass 11.

In the image reading apparatus 1, to control the extension amount of the light shielding portion 20 based on the interval between the document pressing plate 12 and the contact glass 11, the document pressing plate 12 includes a first pulley 21 at the front side (left side in the drawing) and a second pulley 22 at the rear side (right side in the drawing). The first pulley 21 and the second pulley 22 are respectively configured to rotate around a rotation shaft 21A and a rotation shaft 22A that elongate along a direction perpendicular to the paper surface. A wire 23 is stretched over the first pulley 21 and the second pulley 22. One end of the wire 23 at the rear side (right side in the drawing) is fixed to a wire fixing portion 10B, wherein the wire fixing portion 10B is provided in rear of the pivot shaft 12A at an upper part of the main body 10. The other end of the wire 23 at the front side (left side in the drawing) is wound around and fixed to the first pulley 21. The wire 23 fixed to the wire fixing portion 10B and the first pulley 21 is stretched over the second pulley 22. In addition, the first pulley 21 is biased counterclockwise in the drawing by a spring (not shown) or the like.

With the above-described configuration, the second pulley 22 allows the first pulley 21 to pivot smoothly especially when a change is made to the interval between the document pressing plate 12 and the upper surface 10A at the rear side of the main body 10 near the wire fixing portion 10B. In the state shown in FIG. 2 where a wide interval is formed between the document pressing plate 12 and the contact glass 11 at the rear side, compared to the state shown in FIG. 1 where a short interval is formed, the wire 23 is pulled from the first pulley 21 toward the wire fixing portion 10B (toward the one end of the wire 23). This allows the first pulley 21 and the second pulley 22 to pivot clockwise as indicated by the dotted arrows in the drawing. The sheet-like light shielding portion 20 is wound around the first pulley 21 in a reverse direction to the direction in which the wire 23 is wound around. As a result, the light shielding portion 20 is pulled out from the first pulley 21 when the first pulley 21 pivots clockwise. As a result, in the state shown in FIG. 1, the light shielding portion 20 does not extend from the document pressing plate 12; and in the state shown in FIG. 2, the light shielding portion 20 extends from the document pressing plate 12. In this way, the extension amount of the light shielding portion 20 extending from the document pressing plate 12 is controlled based on the interval between the document pressing plate 12 and the contact glass 11 at the rear side.

Figure 3:
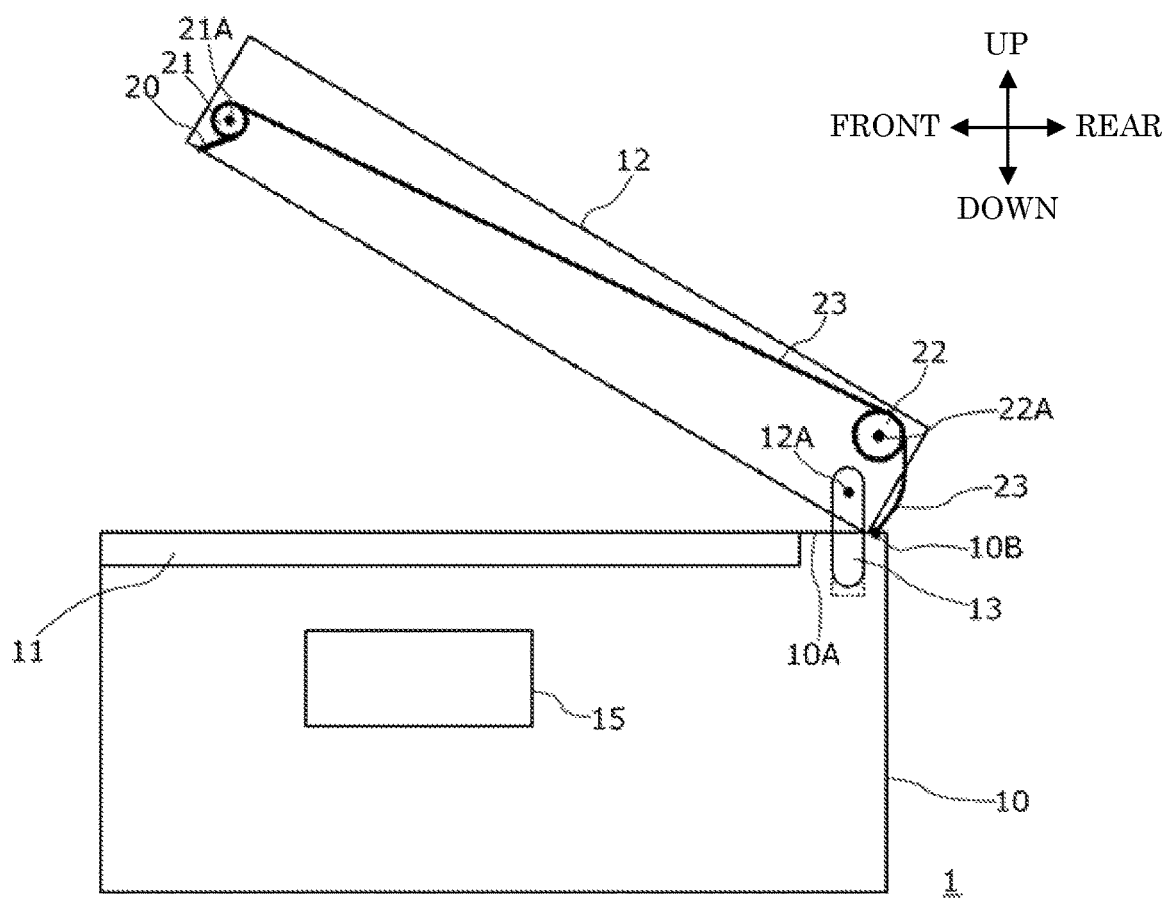
FIG. 3 is a diagram showing a configuration of the image reading apparatus according to the embodiment of the present disclosure in a third state.

FIG. 3 shows, in correspondence with FIG. 5a, a state (a third state) where the document pressing plate 12 is opened in the image reading apparatus 1. In the configuration where the wire fixing portion 10B is in rear of the pivot shaft 12A, when the document pressing plate 12 is opened, the wire 23 is loosened in reverse to the state shown in FIG. 2. Since the first pulley 21 is biased counterclockwise, the light shielding portion 20 does not extend from the document pressing plate 12 at least in this state. That is, in the state shown in FIG. 1 where the thin document P1 is placed and the document pressing plate 12 is closed, and in the state shown in FIG. 3 where the document pressing plate 12 is opened, the light shielding portion 20 does not extend from the document pressing plate 12. This configuration prevents a case where the light shielding portion 20 becomes a hindrance when the thin document P1 is placed. That is, the configuration prevents, for example, a state where the light shielding portion 20 is sandwiched between the document pressing plate 12 and the contact glass 11.

Figure 4:
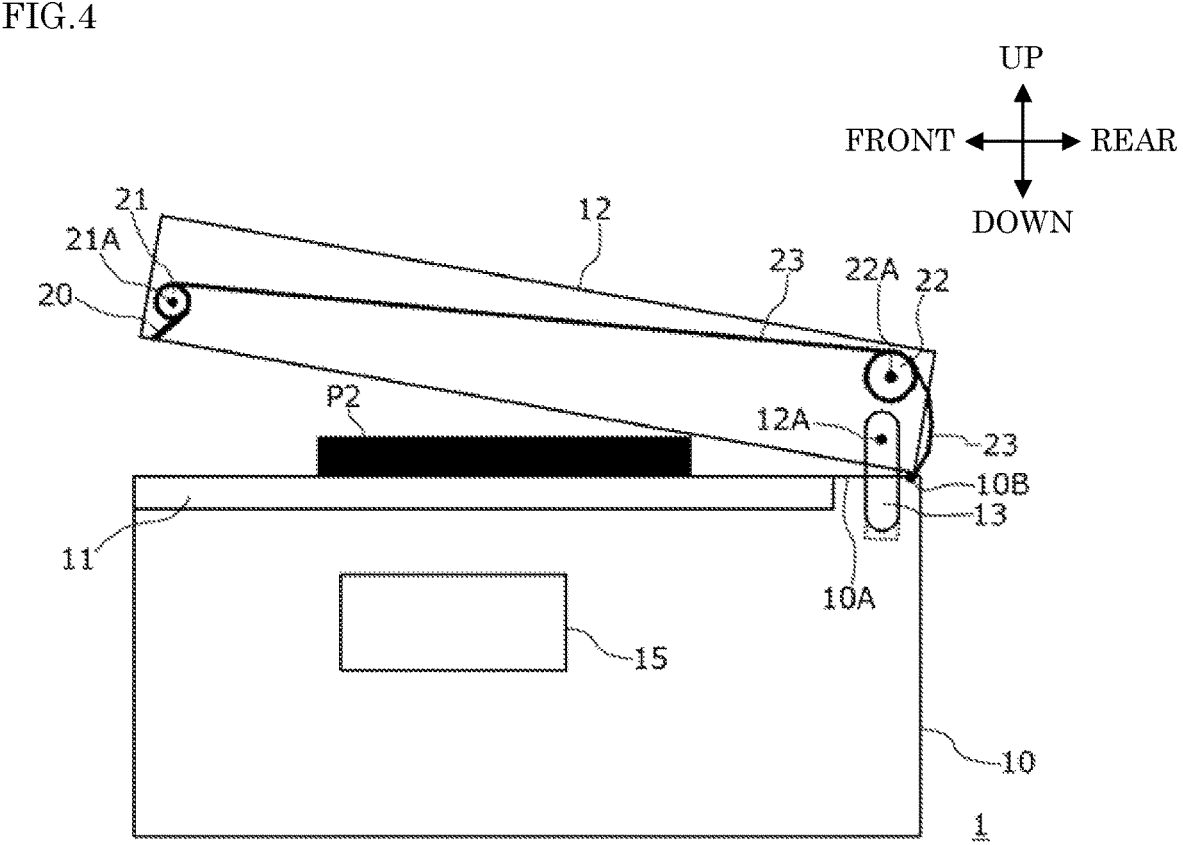
FIG. 4 is a diagram showing a configuration of the image reading apparatus according to the embodiment of the present disclosure in a fourth state.

FIG. 4 shows a state (a fourth state: in the middle of shifting from the state shown in FIG. 3 to the state shown in FIG. 2) where the thick document P2 is placed on the contact glass 11 and the document pressing plate 12 is in the middle of being closed. In this case too, since the interval between the document pressing plate 12 and the contact glass 11 is narrow at the rear side as in the states shown in FIG. 1 and FIG. 3, the light shielding portion 20 does not extend from the document pressing plate 12 as in the case shown in FIG. 3. Subsequently, when the user further adds power to close the document pressing plate 12, the rear end side of the document pressing plate 12 is lifted. This brings the state shown in FIG. 2. In this way, when the thick document P2 is placed on the contact glass 11 and the document pressing plate 12 is closed, the light shielding portion 20 does not extend from the document pressing plate 12 until immediately before the state shown in FIG. 2 appears. As a result, the light shielding portion 20 does not become a hindrance to the working.

The document pressing plate 12 used in the image reading apparatus 1 includes the first pulley 21, the second pulley 22, the wire 23, and the light shielding portion 20 in addition to the components of the document pressing plate 92 of the conventional image reading apparatus 2. Here, none of the first pulley 21, the second pulley 22, and the wire 23 occupies a large volume in the document pressing plate 12. To obtain a sufficient light-shielding effect, the light shielding portion 20 needs to have a large area. In the above-described configuration, however, the sheet-like light shielding portion 20 is wound around and attached to the first pulley 21, and a part of it extends downward from the document pressing plate 12. Accordingly, the light shielding portion 20 does not occupy a large volume in the document pressing plate 12, either. As described above, a document feed device can be used as the document pressing plate 12. In this case, too, the first pulley 21, the second pulley 22, the wire 23, and the light shielding portion 20 can be easily provided in the document feed device. In addition, since these components can be formed from not-expensive parts, the image reading apparatus 1 can be not-expensive.

According to the above-described configuration, the wire 23 is exposed at the rear side of the main body 10. However, regularly, the user is in front of the image reading apparatus 1 to perform an operation with it. As a result, the wire 23 does not become a hindrance to the operation of the user.

In the above-provided example, the first pulley 21, the second pulley 22, and the wire 23 are used to control the extension amount of the light shielding portion 20. However, not limited to this, other structures may be used as far as the extension amount of the light shielding portion extending from the document pressing plate can be adjusted based on the interval between the document pressing plate and the main body at the rear side. For example, the two pulleys (the first pulley and the second pulley) may not be used, but only a single pulley (the first pulley) may be used to realize the same function. In this case, too, it is desirable, from the viewpoint of miniaturizing the apparatus, that a sheet-like light shielding portion is wound around and stored on a roll, and as the roll rotates, the light shielding portion extends from the document pressing plate. It is noted however that the light shielding portion as a whole does not need to be sheet-like, but only a part of it may be sheet-like.

In the above-provided example, the support portion 13 has the structure shown in FIG. 1 or the like. However, the structure for attaching the document pressing plate to the main body is arbitrary as far as the pivot shaft of the document pressing plate can move in the up-down direction with respect to the main body (the upper surface). With such a configuration, too, it is possible to control the extension amount of the light shielding portion based on the interval between the document pressing plate and the upper surface at the side close to the pivot shaft.

In the above-provided example, the light shielding portion 20 is provided only at the front side. However, not limited to this, the light shielding portion may be provided at any side. In that case, it is possible to restrict the illumination light from leaking outside from the side at which the light shielding portion is provided.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:
1. An image reading apparatus comprising:
a main body on whose upper surface, contact glass is provided, the main body having, inside thereof, an image obtaining portion configured to irradiate illumination light from downward, via the contact glass, on a document placed on the contact glass and capture, from downward, an image formed on the document;

a document pressing plate attached to the main body in such a way as to pivot in a vertical direction around a pivot shaft that is provided on a rear side above the upper surface, the document pressing plate being configured to press downward the document placed on the contact glass;

a support attached to the main body so as to protrude upward from the main body, and configured to move in an up-down direction with respect to the main body, wherein the pivot shaft is provided in the support; and a sheet-like light shield configured to, when the document pressing plate presses downward the document placed on the contact glass, extend downward from the document pressing plate with increase of an interval between the document pressing plate and the upper surface on the rear side in the up-down direction.

2. The image reading apparatus according to claim 1, wherein the sheet-like light shield is provided in front of the document placed on the contact glass when the document pressing plate presses downward the document.

3. The image reading apparatus according to claim 1, further comprising:

a first pulley provided in the document pressing plate; and a wire whose one end is fixed to a part of the main body in rear of the pivot shaft, and the other end thereof is attached to the first pulley, wherein the sheet-like light shield is attached to the first pulley so as to extend from the document pressing plate when the wire is pulled from the first pulley toward the one end of the wire such that the first pulley pivots.

4. The image reading apparatus according to claim 3, wherein a second pulley is provided in the document pressing plate such that the wire between the other end and the one end is stretched over the second pulley.

5. The image reading apparatus according to claim 3, wherein the sheet-like light shield is attached in a state of being wound around the first pulley.

6. The image reading apparatus according to claim 5, wherein when the interval between the document pressing plate and the upper surface is small, the sheet-like light shield is wound around the first pulley.

* * * * *